3,290,212
ANTITUSSIVE COMPOSITION

Emilio Testa, Ticino, Switzerland, and Giulio Maffii, Milan, Italy, assignors to Lepetit S.p.A., Milan, Italy
No Drawing. Filed Oct. 23, 1961, Ser. No. 147,034
6 Claims. (Cl. 167—55)

The present invention relates to new antitussive agents. More particularly, the compounds with which the invention is concerned are 4-[2-(N-methylpyrrolidine)]-methoxy-N-(3,4,5-trimethoxybenzoyl)-benzylamine of the formula:

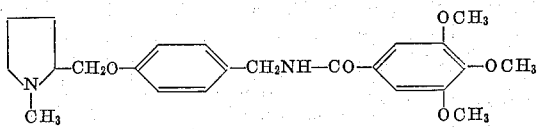

and its non-toxic mineral acid addition salts.

The new compounds of the invention have been found to be exceptionally active in relieving cough even in very stubborn cases.

Pharmacological tests on guinea pigs gave very significative results. The number of coughs caused by acrolein aerosols was decreased by about 40 percent on subcutaneous administration of 5 mg./kg., while the decrease was as high as about 60 percent on administration of 10 mg./kg. of the compound taken in the form of the free base.

The new compounds are characterized by low toxicity. For therapeutical purposes the new compounds may be used as such or associated with the carrier, which may be a solid material, a sterile parenteral liquid or a syrup. When the oral administration is selected as commonly used for this type of drugs the therapeutic administration may be provided in the form of powders, capsules, tablets or other solid dosage forms. For parenteral use, liquid diluents may be employed, such as sterile distilled water, in which the mineral acid salts are freely soluble. Although clinically appreciable effects are observed with doses as low as 1–10 mg., the unit dosage is usually somewhat higher, and may safely reach 500 mg. and more in stubborn cases. Preferably the doses are maintained under 50 mg., owing to the great effectiveness of the compound. For preparing the actual therapeutic composition, the selected dose of the drug may be directly filled into capsules, either alone or associated with solid inert diluents and/or other active ingredients. Tablets may be prepared by associating the drug with the commonly used tableting materials, such as lactose, talc, cornstarch, stearic acid, magnesium stearate or the like. Ampoules are prepared by dissolving the drug, in the form of its mineral acid salts, in sterile distilled water. The composition may also advantageously take the form of a syrup, whereby the drug is dissolved in the common syrup in a concentration calculated so as to administer the proper dose, with or without the addition of suspending and/or flavoring agents and/or other drugs.

The compounds of the invention may be prepared by condensing 4-[-(N-methylpyrrolidino)]-methoxybenzylamine, obtained from 4-[2-(N-methylpyrrolidino)]-methoxybenzaldehyde by catalytic hydrogenation of its oxime, with trimethoxybenzoyl chloride in an inert organic solvent, and working up the hydrochloride of I to obtain the free base. The following examples illustrate the invention.

EXAMPLE 1

*N-methyl-2-chloromethylpyrrolidine hydrochloride*

To 45.5 g. of N-methyl-2-hydroxymethylpyrrolidine in 456 ml. of anhydrous benzene, cooled in an ice bath, 31.5 g. of thionyl chloride are added dropwise under stirring. A white precipitate forms. The mixture is refluxed 5 hrs. The organic solvent is distilled and the unreacted thionyl chloride removed in vacuo. Yield 45.8 g., M.P. 148–149° C.

*4-[2-(N-methylpyrrolidino)]-methoxybenzaldehyde*

The potassium salt of p-hydroxybenzaldehyde (26.5 g.) is refluxed with isopropylalcohol (170 ml.) till solution occurs. Then an isopropyl alcohol solution (30 ml.) of N-methyl-2-chloromethylpyrrolidine (obtained by extracting with ethyl ether an aqueous solution of 28 g. of hydrochloride made alkaline with 50% aqueous $K_2CO_3$) is added dropwise under stirring. The mixture is refluxed 3 hrs., cooled, filtered and the precipitate washed with ethyl ether. After removing the solvent an oil is obtained, which is rectified in vacuo. Yield 26.01 g., B.P. 140° C./1 mm. Hg.

*4-[2-(N-methylpyrrolidino)]-methoxybenzaldoxime*

To 36.5 g. of 4-[2-(N-methylpyrrolidino)]-methoxybenzaldehyde in 364 ml. $H_2O$, 14.8 g. of hydroxylamine hydrochloride are added with cooling. Then 200 ml. of a 10% $Na_2CO_3$ aqueous solution are added, the suspension obtained is stirred 1 hr., filtered and the precipitate dried in vacuo. Yield 41 g.

*4-[2-(N-methylpyrrolidino)]-methoxybenzylamine*

A mixture of 17 g. of 4-[2-(N-methylpyrrolidino)]-methoxybenzaldoxime, 210 ml. ethyl alcohol containing 34 g. of anhydrous ammonia, and 2.6 g. of Ni-Raney, is hydrogenated at 80° C. and 80 atms. pressure. The hydrogenation requires about 4 hrs. Then the catalyst is filtered off and the solvent removed in vacuo. The residue is distilled in vacuo. Yield 12.9 g., B.P. 152–155° C./1.5 mm. Hg.

*4-[2-(N-methylpyrrolidino)]-methoxy-N-(3,4,5-trimethoxybenzoyl)-benzylamine*

To a solution of 12.9 g. of 4-[2-(N-methylpyrrolidino)]-methoxybenzylamine in 142 ml. of anhydrous benzene, 13.5 g. of 3,4,5-trimethoxybenzoyl chloride in 142 ml. of anhydrous benzene are added. The mixture is warmed 1 hr. at 60° C., cooled, and poured into $H_2O$. The organic layer is extracted with water, the combined aqueous phases made alkaline with $Na_2CO_3$ and extracted with ethyl ether. After drying over $Na_2SO_4$, the solvent is removed in vacuo. An oil is obtained which crystallised on standing. Yield 13.6 g., M.P. 85–95° C. The hydrochloride in prepared in fine form by treating an ethyl ether solution of the free base with an ethyl ether solution of hydrogen chloride, or by other obvious processes of preparation.

EXAMPLE 2

Three grams of 4-[2-(N-methylpyrrolidino)]-methoxy-N-(3,4,5-trimethoxybenzoyl)-benzylamine base are filled into one hundred capsules and are ready for therapeutic use.

EXAMPLE 3

The following ingredients are thoroughly admixed:

| | G. |
|---|---|
| 4-[2-(N-methylpyrrolidino)]-methoxy-N-(3,4,5-trimethoxybenzoyl)-benzylamine hydrochloride | 5.0 |
| Cornstarch | 15.0 |
| Talc | 2.5 |
| Stearic acid | 0.5 |

The mixture is tabletted into one hundred tablets ready for therapeutic use.

EXAMPLE 4

A syrup is prepared from the following ingredients:

| | G. |
|---|---|
| 4-[2-(N-methylpyrrolidino)]-methoxy-N-(3,4,5-trimethoxybenzoyl)-benzylamine hydrochloride | 1.0 |
| Calcium lactate | 0.4 |
| Phosphoric acid | 0.09 |
| Syrup of lemon to 100 ml. | |

It contains about 0.05 gr. of the drug in 5 ml.

We claim:

1. An antitussive pharmaceutical composition whose active ingredient consists essentially of an effective proportion of a compound of the class consisting of 4-[2-(N-methylpyrrolidino)] - methoxy - N-(3,4,5-trimethoxybenzoyl)-benzylamine and its non-toxic mineral acid addition salts, together with a pharmaceutically acceptable carrier.

2. An antitussive composition in dosage unit form, whose active ingredient consists essentially of from 0.01 to 0.5 gram of 4-[2-(N-methylpyrrolidino)]-methoxy-N-(3,4,5-trimethoxybenzoyl)-benzylamine, together with a diluent.

3. An antitussive composition in dosage unit form, whose active ingredient consists essentially of from 0.01 to 0.5 gram of 4-[2-(N-methylpyrrolidino)]-methoxy-N-(3,4,5-trimethoxybenzoyl)-benzylamine per dosage unit, and a solid pharmaceutical carrier.

4. An antitussive composition in dosage unit form, whose active ingredient consists essentially of from 0.01 to 0.5 gram of 4-[2-(N-methylpyrrolidino)]-methoxy-N-(3,4,5-trimethoxybenzoyl)-benzylamine hydrochloride per dosage unit, and a liquid diluent.

5. An antitussive composition as in claim 4, wherein the liquid diluent is sterile distilled water.

6. An antitussive composition in syrup form whose active ingredient consists essentially of from 0.1 to 1.0 percent of 4-[2-(N-methylpyrrolidino)]-methoxy-N-(3,4,5 - trimethoxybenzoyl) - benzylamine hydrochloride, together with a syrup pharmaceutical carrier.

References Cited by the Examiner
UNITED STATES PATENTS

| | | | |
|---|---|---|---|
| 1,794,292 | 2/1931 | Hollo | 167—55 |
| 1,915,334 | 6/1933 | Salzberg et al. | 260—243 |
| 2,075,359 | 3/1937 | Salzberg | 167—22 |
| 2,425,320 | 8/1947 | Hill | 252—149 |
| 2,606,155 | 8/1952 | Hill | 252—149 |
| 2,820,739 | 1/1958 | Brown | 167—55 |
| 2,980,693 | 4/1961 | Cavalla | 260—326.3 |
| 3,030,380 | 4/1962 | Weygand et al. | 260—226.3 |

JULIAN S. LEVITT, *Primary Examiner.*

NICHOLAS S. RIZZO, LEWIS GOTTS, *Examiners.*

J. TOVAR, S. ROSEN, *Assistant Examiners.*